E. GRUENFELDT.
FASTENING DEVICE FOR VEHICLE BODY STRUCTURES.
APPLICATION FILED MAY 12, 1909.
958,917.
Patented May 24, 1910.
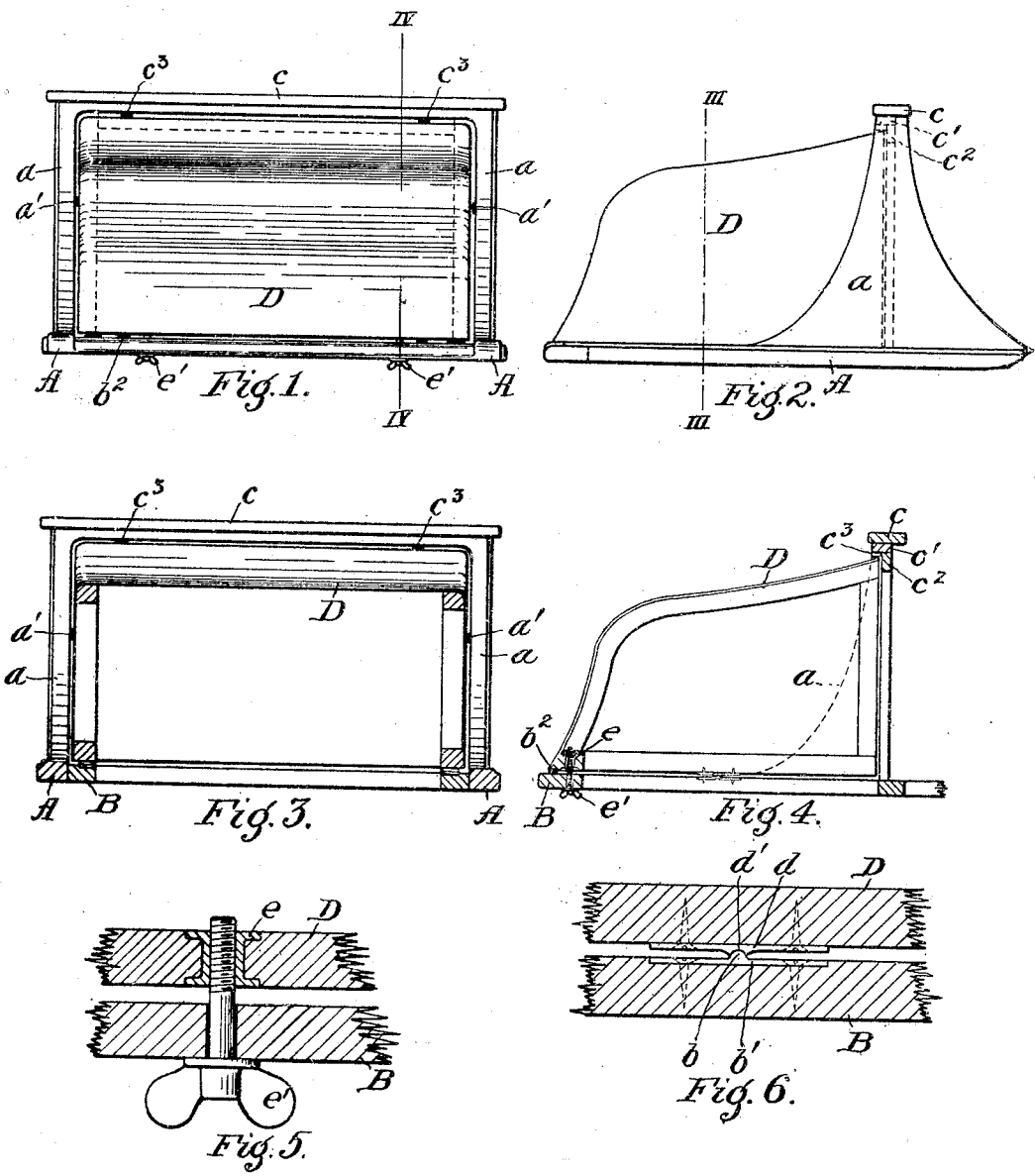
Witnesses
Herman Eisele
Curt B. Mueller
Inventor
Emil Gruenfeldt,
by A. E. Merkel.
Attorney

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

FASTENING DEVICE FOR VEHICLE-BODY STRUCTURES.

958,917.     Specification of Letters Patent.     Patented May 24, 1910.

Application filed May 12, 1909. Serial No. 495,541.

*To all whom it may concern:*

Be it known that I, EMIL GRUENFELDT, a subject of the Emperor of Germany, resident of Cleveland, county of Cuyahoga, and State of Ohio, have invented a new and useful Improvement in Fastening Devices for Vehicle-Body Structures, of which the following is a specification, the principle of the invention being herein explained and the best mode in which I have contemplated applying that principle so as to distinguish it from other inventions.

My invention relates to devices for fastening parts of vehicle bodies, and particularly to means for fastening a battery cover to the main body member of the vehicle.

The object of the invention is to provide means whereby the battery cover may be readily removed and replaced, and when so replaced will be held in a secure and stable manner, and so as to prevent, as far as possible, injury to such cover ordinarily incident to the distortion of the frame while the vehicle is in use.

The said invention consists of means hereinafter fully described, and particularly set forth in the claims.

The annexed drawing and the following description set forth in detail certain means embodying the invention, the disclosed means, however, constituting but one of various forms in which the principle of the invention may be used.

In said annexed drawing:—Figure 1 is a front elevation of the forward portion of the main body member of a vehicle, showing the battery cover in place thereon. Fig. 2 is a side elevation of the parts shown in Fig. 1. Fig. 3 is a vertical section taken upon the plane indicated by line III—III in Fig. 2. Fig. 4 is a vertical longitudinal section taken upon the plane indicated by line IV—IV in Fig. 1. Figs. 5 and 6 are detail sections shown upon an enlarged scale.

As shown in the drawing, the battery cover D consists of an end, top and two sides, all forming one integral structure. This cover has its inner end seated between two lateral upright members $a\ a$ forming an integral part of the main body member of the vehicle, the upper inner edge of the cover being located beneath a transverse abutment member $c'$, which is suitably secured to a transverse member $c$ joining the top of the upright members $a\ a$. A rectangular frame $c^2$ limits the inward movement of the cover while it is being placed in position.

A horizontal rectangular frame B is suitably secured upon the inside of the sills A A of the main body member and directly supports the batteries (not shown) and the cover.

Upon the lower surface of each of the side members of the cover is secured a plate $d$ provided with a semi-cylindrical bearing $d'$. Each of the bearings of these plates engages a semi-cylindrical journal $b$ forming a part of the journal plate $b'$ which is secured to the upper surface of the adjacent part of the frame B, as shown in Fig. 3. The height of the inner end of the cover is made somewhat less than the distance between the frame B and the abutment bar $c'$, so that a limited amount of pivotal movement may be imparted to the said cover.

Passing through the outer transverse member of the frame B are two thumb screws $e'\ e'$, which engage suitable nuts $e\ e$, secured in any desired manner to the lower portion of the outer end of the cover, as shown. It will therefore be seen that by turning the screws $e'$ the cover may be moved upon its pivot. The height of the inner end of the cover is made such that the outer end thereof may be drawn down toward the frame a distance such as to cause the upper edge of said inner end to engage the abutment bar $c'$. In this manner, it will be seen that the cover may be mounted upon its pivotal axis and caused to firmly engage the abutment bar, thereby securing it tightly in place on the main body member of the vehicle.

In practice, I prefer to introduce rubber buffers, $b^2$ and $c^3$, which receive the direct contact of the outer lower end and upper inner edge of the cover, as shown in the drawing.

By providing the pivotal construction above described, it will be seen that such pivot prevents longitudinal displacement of the cover with reference to the main body portion, and any strain incident to longitudinal displacement is therefore diverted from the screws and nuts to the pivot. Inasmuch as this pivot may be made, as will be readily understood, very accurately and so as to allow of no lost motion, a transfer of strain from the pivot to the screws and nuts may be absolutely prevented. This is an advantageous feature, in that it is necessary in practice, in the form of device shown in the drawing, to make the apertures in the frame B somewhat larger in diameter than the diameter of the screws, in order that the latter may be readily inserted and removed therefrom by hand.

As shown in Fig. 1, the width of the cover D is made somewhat less than the distance between the inner surfaces of the upright members $a$ $a$, so that a given amount of play may be had between the main body member and the cover. This play is provided so as to prevent as far as possible the distortion and consequent injury to the cover when the main body member is distorted as a result of strain applied thereto in the operation of the vehicle. I prefer also in practice, to introduce between the upright members $a$ $a$ and the cover, rubber buffers, $a'$ $a'$, similar to the buffers $b^2$ and $c^3$. It will be obvious that these buffers may be attached either to the cover or to the main body member, as desired.

Having fully described my invention, what I claim therefore and desire to secure by Letters Patent is:—

1. In a device of the class described, the combination of a main body member provided with abutment means, a battery cover pivotally mounted midway of its ends upon said member, and arranged to engage said abutment member, and means at one end for effecting such engagement.

2. In a device of the class described, the combination of a main body member, a battery cover pivotally mounted midway of its ends upon said member, having its pivotal axis transverse with respect thereto, and means for fixedly holding both ends of the cover to said member.

3. In a device of the class described, the combination of a main body-member provided with transverse abutment means; a battery-cover pivotally mounted intermediately of its ends upon said member and having its pivotal axis transverse with relation thereto, the inner end of said cover being located beneath said abutment means; and means for securing the outer end of said cover to said frame.

4. In a device of the class described, the combination of a main body-member; provided with abutment means; a battery-cover pivotally mounted intermediately of its ends upon said member, and having one end adjacent to such abutment means; means for drawing the other end of said cover and said frame toward and fixing them to each other whereby the engagement of the cover with said abutment means is effected.

5. In a device of the class described, the combination of a main body-member provided with transverse abutment means; a battery-cover pivotally and removably mounted upon said member and having its pivotal axis transverse with respect to the latter; the one end of said cover being located beneath said abutment means; and means for drawing the outer end of said cover and said frame toward and fixing same to each other, whereby said one end of the cover may be caused to engage the said abutment means.

Signed my me, this 11th day of May, 1909.

EMIL GRUENFELDT.

Attested by—
 CURT B. MUELLER,
 K. F. JUENGLING.